3,441,335
PERISCOPIC REARVIEW SYSTEM
Roger D. Johnson, Zeeland, Mich., assignor to Donnelly Mirrors, Inc., Holland, Mich., a corporation of Michigan
Filed June 1, 1964, Ser. No. 371,513
Int. Cl. G02b 17/00, 23/02, 5/08
U.S. Cl. 350—55                            4 Claims

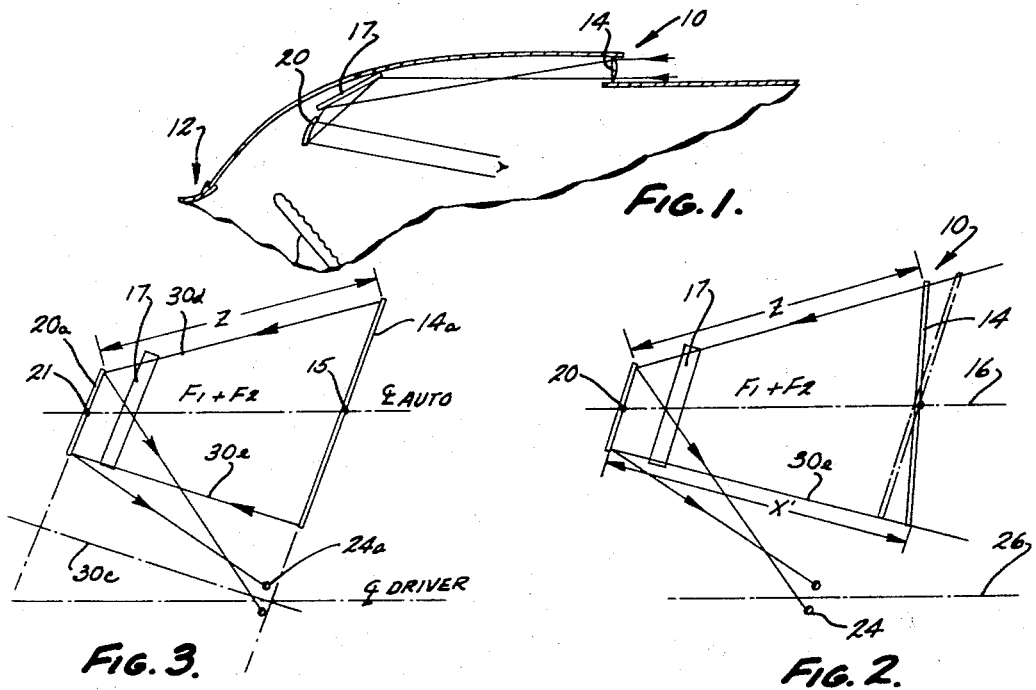
Fig. 1.  Fig. 3.  Fig. 2.
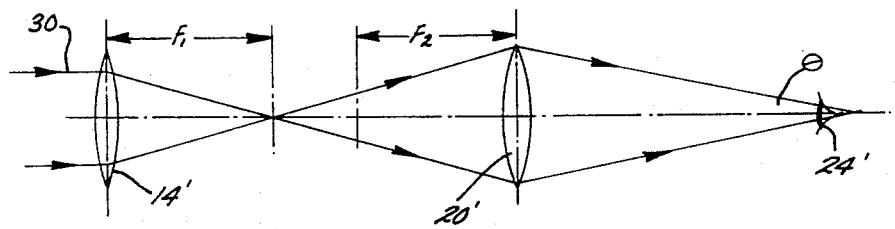
Fig. 4.
Fig. 5.
INVENTOR
ROGER D. JOHNSON
BY
ATTORNEYS

United States Patent Office 3,441,335
Patented Apr. 29, 1969

ABSTRACT OF THE DISCLOSURE

A periscopic rearview system in which an elongated eye lens means and an elongated transparent objective lens of substantially greater length than the eye lens means is provided, both the eye lens means and objective lens being substantially located on the centerline of the vehicle but transverse thereto whereby the eye lens means is located a transverse distance from the driver's seat such that it is necessary to tilt and face the eye lens across the vehicle's centerline creating an imbalance of image distortion from one end to the other. This imbalance is corrected by slanting or tilting the objective lens so that the ends of the eye lens and objective lens are spaced apart the same distance.

---

This invention relates to rearview systems for vehicles, and more particularly relates to a periscopic rearview system with improved image transmission.

Periscopic rearview systems for vehicles have been known in the automotive field for some time. While such systems enable wide angle vision to be achieved, few of the many proposed periscopic variations are really acceptable and/or reliable. One substantial difficulty encountered is image distortion occurring over the wide angle range of vision, especially at the outer fringes of the lens system.

It is an object of this invention to provide a wide angle periscopic rearview system employing straight lens, and having improved image transmission with minimized fringe distortion.

Another object of this invention is to provide a wide angle periscopic rearview vehicular system employing straight objective and eye lenses in a manner effecting improved image transmission by a small but extremely significant change in the lens arrangement.

These and several other objects of this invention will become apparent upon studying the following specification in conjunction with the drawings in which:

FIG. 1 is a side elevational, fragmentary view showing the first form of the novel system combined with a vehicle;

FIG. 2 is a plan-type ray trace diagram with the novel lens arrangement in FIG. 1;

FIG. 3 is a plan, ray trace diagram showing the prior art arrangement;

FIG. 4 is a side elevational ray trace diagram with a pair of conventional lenses to illustrate a correct optical relationship therebetween in explanation of this invention;

FIG. 5 is a side elevational view of the pair of lenses in FIG. 4 show an incorrect relationship therebetween;

FIRST FORM

Figure 6:
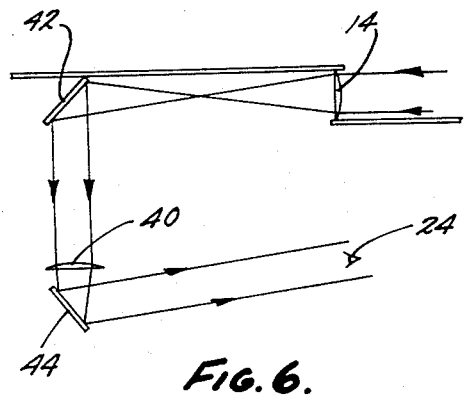
FIG. 6 is a side, elevational view of a modified form of the novel system, employing a different type of eye lens means.

Referring now more specifically to the drawings, the first form of the complete novel rearviewing system 10 is shown incorporated into a vehicle 12. The system comprises two lenses, one transmitting and one reflecting, and an inverting mirror, all arranged in a particular relationship with respect to the vehicle and its driver.

The objective lens 14 extends transversely across the centerline 16 of the vehicle. It preferably is positioned between vertically off-set portions of the vehicle roof to provide wide angle vision of the rear. The lens is fixedly mounted and sealed on its upper and lower surfaces. This linear lens has a convex rear surface from top to bottom. It may have a planar front face. Its focal length is normally in the range of 8 to 20 inches. The eye lens is also a straight or linear lens positioned across the centerline of the auto. It also has a focal length about in the range of 8 to 20 inches. The eye lens is considerably shorter in length, usually about ⅓ or less of the objective lens length.

In this form of the system, the eye lens means is a first surface reflector having a concave reflective surface of cylindrical type, i.e., a cylindrically concave eye mirror.

Between the two lenses is a planar inverting mirror 17 which reflects the rays from lens 14 to reflecting eye lens 20.

The eyes 24 of the vehicle driver are to one side of the vehicle center, so that the centerline 26 of the vehicle driver is parallel to the centerline of the vehicle. The eye lens is positioned diagonally across the vehicle centerline 16.

Basically, this type of system is a "relay system," in that parallel rays entering the system are inverted and rendered parallel upon exciting the system. This fact is true only when the two lenses are separated by the sum of their focal lengths. However, since the driver sits to one side of such a system, when he views an object through such a relay system, the actual distance traveled by the light rays are different, usually greater than the sum of the focal lengths since they are not perpendicular to the surfaces of the lenses. When the distance along the light path is greater than the sum of the focal lengths, the parallel rays entering the system are rendered convergent upon exciting. It is important to keep in mind that parallel rays referred to are caused by a point source of light and are parallel, practically speaking, because of the great distance from this point to the system. By way of explanation, referring to FIGS. 4 and 5, when rays 30 enter a portion of objective lens 14' spaced exactly from eye lens 20' a distance equal to the sum of the focal lengths, the entering rays are parallel and the exit rays 30a are parallel. No distortion occurs therefore. When portions of the lens through which the rays are passing are spaced greater than the sum of the focal lengths, however, as illustrated in FIG. 5, the incoming parallel rays 30 after passing through objective lens 14' and eye lens 20', are rendered convergent with an angle of theta degrees. Thus, an eye 24' within the convergent ray path experiences image distortions because the original parallel rays appear now to the eye as covering an angle of theta degrees. The phenomenon offers the eye the illusion that the point source is now a vertical streak.

Conventionally, the objective and eye lenses of a vehicle periscopic system are mounted according to the arrangement illustrated in FIG. 3. If the lenses extended clear across the vision of driver's eyes 24a, as illustrated for example by the phantom lines in FIG. 3, and the driver were viewing an image directly behind him, the ray trace would be normal to the lenses like ray trace 30c. Therefore, the lenses would be parallel and optically spaced a distance equal to $F_1+F_2$, i.e., the sum of the focal lengths of the eye lens and the objective lens. Since however, the image is generally centered on the vehicle centerline, the parallel lens are spaced further so that $F_1+F_2$ is measured along the vehicle centerline from point 15 in the center of lens 14a to point 21 in the center of lens 20a. With this relationship, a ray passing through the center of the lenses would be properly transmitted since it would pass through the sum of the focal lengths between the lenses. However, the actual rays passing through the rearviewing system in the wide angle scope vary between the extremities of ray traces 30d and 30e so that the light path over most of the system width is quite different from $F_1+F_2$. Portion $x$ of ray 30e between the lenses is significantly shorter than $F_1+F_2$, while portion $z$ of trace 30d is much greater. The result is "end flare" distortion.

It has been found that by a different relationship between these lenses, the image distortion can be substantially reduced so that visual transmission is markedly improved. This is achieved by locating the eye lens from the objective lens an optical spacing equal to $F_1+F_2$, and then pivoting the objective lens so that the two ends of the diagonal objective lens are optically spaced equal amounts from the two respective ends of the eye lens. Then the optical distance $z'$ between the far ends of the lenses equals the optical distance $x'$ between the near ends. The lenses are now in a non-parallel condition in direct contradiction to prior teachings. It has been found that end flare distortion is greatly improved and almost eliminated by this unique relationship. Therefore, image transmission is greatly improved.

SECOND FORM

Figure 7:
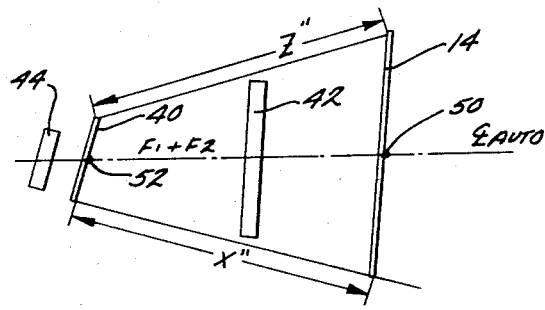
FIG. 7 is an expanded, plan, ray trace diagram of the system in FIG. 6.

In FIGS. 6 and 7 of the drawings, a second form of the novel system is disclosed. In FIG. 6, the system includes an objective lens 14 like that in the first form of the invention, but, instead of the concave cylindrical eye lens, or more specifically eye lens means includes a plano-convex transmitting transparent lens 40. In order to employ this lens effectively in the vehicle, a pair of reflecting mirrors 42 and 44 must be employed. Mirror 42 receives the rays from the objective lens and reflects them down through the plano-convex elongated lens 40, which then focuses the rays on eye mirror 44 for reflection to the driver's eyes 24.

The same criteria regarding the spacing of the lenses applies as previously. The important dimension is the optical distance between the two lenses 14 and 40 rather than the physical distance. Thus, centers 50 and 52 of lenses 14 and 40 are optically spaced apart a distance equal to $F_1+F_2$, i.e., the sum of the focal lengths of the lenses, and the respective ends of the two lenses diagonal to the vehicle centerline, are spaced at equal optical distances so that $x''$ equals $z''$.

The result of the relatively small but extremely significant change of relationship between the eye lens means and the objective lens produces a much more practical system with reliable image transmission. Additional advantages may be apparent to those in the art upon studying the foregoing form of the invention. It is also conceivable that certain minor changes in methods of mounting the structure in the vehicle or forming the vehicle body to accommodate the periscopic system could be readily made. Hence, the invention is to be limited only by the scope of the appended claims and the reasonably equivalent structures to those defined therein.

I claim:
1. A vehicular rearview system in a vehicle, comprising: an elongated eye lens means; an elongated transparent objective lens of substantially greater length than said eye lens means; both said lenses being generally transverse to the vehicle across the centerline thereof; said eye lens means being diagonally slanted in one direction across said vehicle centerline, facing generally toward the driver's eye position in the vehicle such that the intersection of the focal plane of said eye lens by a perpendicular line drawn from the driver's eye position to said focal plane is substantially spaced from the intersection of said vehicle centerline and said focal plane; the central portion of said lenses being spaced apart a distance measured along said vehicle centerline equal to the sum of the focal lengths of said lenses; said objective lens being slanted across said vehicle centerline in the opposite direction of said one direction so that the ends of said lenses closest the driver's position in said vehicle are spaced apart the same distance as that between the opposite ends of said lenses away from the driver's position whereby the distortions on each side of said vehicle centerline are substantially balanced on each side of said vehicle centerline.

2. A vehicular rearview system in a vehicle, comprising: an elongated straight reflective eye lens; an elongated straight transparent objective lens of substantially greater length than said eye lens; both said lenses being generally transverse to the vehicle across the centerline thereof; said lenses being diagonally slanted in opposite directions across said vehicle centerline; the central portions of said lenses being spaced apart a distance measured along said vehicle centerline equal to the sum of the focal lengths of said lenses; and the ends of said lenses closest the driver's position in said vehicle being spaced apart the same distance as that between the opposite ends of said lenses away from the driver's position.

3. The system in claim 2 wherein said eye lens means comprises a cylindrically concave elongated reflector.

4. A vehicular rearview system in a vehicle, comprising: eye lens means including a plano-convex lens and a reflecting surface operably positioned adjacent thereto to reflect image rays toward the vehicle driver's eyes; an elongated straight transparent objective lens of substantially greater length than said eye lens; both said lenses being generally transverse to the vehicle across the centerline thereof; said lenses being diagonally slanted in opposite directions across said vehicle centerline; the central portions of said lenses being spaced apart a distance measured along said vehicle centerline equal to the sum of the focal lengths of said lenses; and the ends of said lenses closest the driver's position in said vehicle being spaced apart the same distance as that between the opposite ends of said lenses away from the driver's position.

References Cited

UNITED STATES PATENTS 3,280,700  10/1966  Donnelly et al. _____ 350—212

FOREIGN PATENTS 432,240  1926  Germany.
473,804  1929  Germany.

RONALD L. WIBERT, *Primary Examiner.*

WILLIAM L. SIKES, *Assistant Examiner.*

U.S. Cl. X.R.

350—49, 301